US009606939B2

(12) United States Patent
Chinnakkonda Vidyapoornachary et al.

(10) Patent No.: US 9,606,939 B2
(45) Date of Patent: *Mar. 28, 2017

(54) MEMORY DATA SECURITY

(71) Applicant: International Business Machines Corporation, Armonk, NY (US)

(72) Inventors: Diyanesh B. Chinnakkonda Vidyapoornachary, Bangalore (IN); Timothy J. Dell, Colchester, VT (US)

(73) Assignee: International Business Machines Corporation, Armonk, NY (US)

( * ) Notice: Subject to any disclaimer, the term of this patent is extended or adjusted under 35 U.S.C. 154(b) by 186 days.

This patent is subject to a terminal disclaimer.

(21) Appl. No.: 14/632,025

(22) Filed: Feb. 26, 2015

(65) Prior Publication Data
US 2016/0253271 A1    Sep. 1, 2016

(51) Int. Cl.
*G06F 12/14*   (2006.01)
*G06F 1/32*   (2006.01)
*G06F 21/62*   (2013.01)

(52) U.S. Cl.
CPC ........ *G06F 12/1433* (2013.01); *G06F 1/3296* (2013.01); *G06F 21/6245* (2013.01); *G06F 2212/1052* (2013.01)

(58) Field of Classification Search
CPC ...... G06F 21/78–21/80; G06F 12/1254; G06F 21/602; G06F 21/62; G06F 21/6209; G06F 2221/2103; G06F 2221/2129
See application file for complete search history.

(56) References Cited

U.S. PATENT DOCUMENTS

| 5,442,704 | A | 8/1995 | Holtey |
| 6,047,343 | A | 4/2000 | Olarig |
| 6,643,777 | B1 | 11/2003 | Chu |
| 6,816,968 | B1 | 11/2004 | Walmsley |
| 7,155,590 | B2 | 12/2006 | Mathis |
| 7,308,102 | B2 | 12/2007 | Anson et al. |
| 7,634,629 | B2 | 12/2009 | Nemiroff et al. |
| 8,255,700 | B2 | 8/2012 | Kitariev et al. |
| 2004/0088588 | A1 | 5/2004 | Awada et al. |
| 2007/0130434 | A1 | 6/2007 | Chu et al. |
| 2010/0275010 | A1 | 10/2010 | Ghirardi |

OTHER PUBLICATIONS

Chinnakkonda Vidyapoornachary et al., "Memory Data Security", U.S. Appl. No. 15/098,360, filed Apr. 14, 2016.
List of IBM Patents or Patent Applications Treated as Related, Apr. 12, 2016, 2 pages.
U.S. Appl. No. 15/098,360, Accelerated Examination Support Document, Dated Apr. 11, 2016, 18 pages.
Anonymous, "Method for data security in electronic memory devices," IP.com No. 000227795, May 16, 2013.

*Primary Examiner* — Jared Rutz
*Assistant Examiner* — Khoa D Doan
(74) *Attorney, Agent, or Firm* — Nolan M. Lawrence

(57) ABSTRACT

A memory module secures data stored on the memory module. A request for the data from a computer system is received by the memory module. A verification key from the computer system is also received by the memory module. A reference key is retrieved by the memory module, the reference key is stored on the memory module. A comparison status is generated by the memory module by comparing the verification key with the reference key. A response is sent to the computer by the memory module that is dependent upon the comparison status.

18 Claims, 4 Drawing Sheets

MEMORY DATA SECURITY

BACKGROUND

The present disclosure relates to data security, and more specifically, to utilizing a key to restrict access to data in memory.

Memory is a foundational component of computing devices that is increasingly used to store critical information. Memory may be found in desktop computers and mobile devices, such as laptop computers and smart phones. Memory may also be found in other computing devices, such as digital cameras, computer servers, and control systems for power plants. The memory may store personal information such as social security numbers and medical information. The memory may also store financial or critical information such as bank access codes. Thus, memory must be secure from unauthorized third-parties.

SUMMARY

Embodiments of the disclosure may include a method for securing data stored on at least one memory chip of a memory module. A request for the data from a computer system is received by the memory module. A verification key from the computer system is also received by the memory module. A reference key is retrieved by the memory module, the reference key is stored on the memory module. A comparison status is generated by the memory module by comparing the verification key with the reference key. A response is sent to the computer system by the memory module in response to the comparison status.

Embodiments of the disclosure may also include a memory module for securing data stored on the memory module. A memory chip on the memory module is configured to store the data. A communication bus on the memory module is configured to receive both a request for the data from a computer system and a verification key from the computer system. The communication bus is also configured to transmit the request for the data to the memory chip. A reference chip on the memory module is configured to store a reference key related to the memory module. A comparison chip on the memory module is configured to receive both the verification key from the communication bus and the reference key from the reference chip. The comparison chip is also configured to generate a comparison status in response to comparing the verification key with the reference key. A logic chip on the memory module is configured to receive both the data from the memory chip and the comparison status from the comparison chip. The logic chip is further configured to send a response to the communication bus in response to the comparison status.

Embodiments of the disclosure may also include a system for securing data. The system includes a processor, a memory controller, and a memory module. The memory controller is configured to receive a request for the data from the processor. A memory chip on the memory module is configured to store the data. A communication bus on the memory module is configured to receive both a request for the data and a verification key from the memory controller. The communication bus is also configured to transmit the request for the data to the memory chip. The communication bus is also configured to send a response to the memory controller. A reference chip on the memory module is configured to store a reference key related to the memory module. A comparison chip on the memory module is configured to receive both the verification key from the communication bus and the reference key from the reference chip. The comparison chip is also configured to generate a comparison status in response to comparing the verification key with the reference key. A logic chip on the memory module is configured to receive both the data from the memory chip and the comparison status from the comparison chip. The logic chip is further configured to send a response to the communication bus in response to the comparison status.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
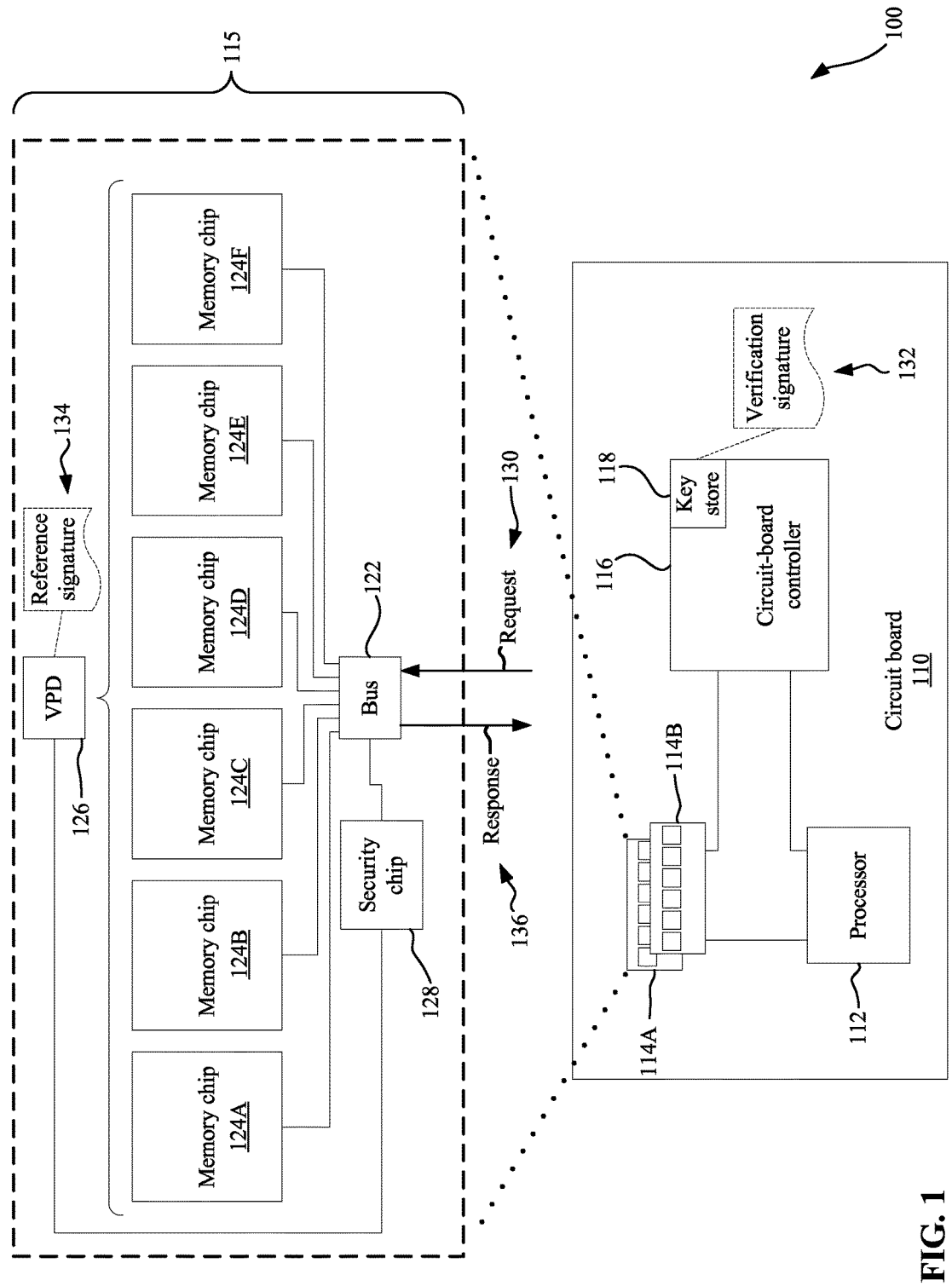
FIG. 1 depicts an example computer system with one or more memory modules consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to securing data on memory modules, more particular aspects relate to authentication of a computer system to a memory module. While the present disclosure is not necessarily limited to such applications, various aspects of the disclosure may be appreciated through a discussion of various examples using this context.

Ensuring data is secure in computer systems is a never ending process that requires users to spend significant time and money. With the advent of the internet, computer systems are increasingly becoming a point of attack. Information that is valuable to the lives of both individuals and large businesses are contained on computer systems. Because of the networked nature of modern computer systems, many times sensitive data is susceptible to attacks when it is in random access memory (herein, RAM). Also, the commoditization of memory chips has allowed entire databases of sensitive data to be stored in memory. These new RAM-based computing techniques are in high demand for simulation and complex computing services, such as data analytics.

In modern computer systems RAM chips are contained on memory modules. These memory modules are interoperable with multiple computer systems, increasing the upgradeability and reparability of computer systems. Memory modules are often fairly small and can easily be taken out of computer systems and placed on a user's person, such as in a pants-pocket. Because of this computer system modularity, memory modules are susceptible to physical theft.

Additionally, advanced techniques allow thieves to steal the information straight from the physical memory chips. For example, by freezing the memory chips of a memory module and then physically removing the memory module from a computer system. While the memory chips are still frozen the memory module is placed into a reader and the sensitive information is copied. Then the memory module is replaced into the computer system. The thieves may then take the copy of the sensitive information off-site from the computer system and, at a later time, access the sensitive information.

Embodiments of the present disclosure may provide for a memory module that selectively provides access to the data stored on the memory chips. The memory module may comprise the following: a mainline memory data bus that receives and sends data between the memory module and a computer system; one or more memory arrays containing information for the computer system; one or more buffers that operate in conjunction with the memory bus; one or more decoders that receive commands from the computer system; a vital product data chip (herein, VPD) that contains information about the memory module; a comparator; and a logic chip to send responses to the memory bus. The memory arrays may be located inside one or more dynamic random access memory (herein, DRAM) chips. The decoders and the buffers may also be located inside the one or more DRAM chips.

The components of the memory module may be communicatively coupled to each other by way of a serial bus technology (e.g., Inter-Integrated Circuit). The memory module may take the form of random access memory in a desktop computer. In some embodiments, the memory module may be in the form of a long-term storage (e.g., an SD card, a hard-disk drive). In some embodiments, the memory module may include an operating mode that allows the memory module to bypass the comparator and the logic chip.

The mainline memory data bus (alternatively, memory bus) of the memory module may be locked or unlocked. The memory bus may be communicatively coupled to the memory arrays of the memory module and the computer system such that the computer system can send requests to the memory module. When the memory bus is unlocked, the memory bus may direct a response (e.g., the information requested) to a computer system from the memory arrays. When locked, the memory bus may deny access to the information stored on the memory arrays. The memory bus may receive requests from the computer system that do not include a key. The memory bus may respond to requests that do not include a key by providing data to the computer system that indicates that the memory bus is locked (e.g., all '0' characters, all '1' characters, etc.). The memory bus may not respond at all to a request from the computer system when the memory bus is locked.

In some embodiments, when locked the memory bus may deny access to some of the information stored on the memory arrays. For example, the memory bus may receive request from the computer system that include a key corresponding to a single DRAM chip and not to other DRAM chips of the memory module. The memory bus may only unlock the memory bus for responses from the DRAM chip that includes a key, and may lock the memory bus for responses from the DRAM chips that do not include a key. In some embodiments, the memory bus may deny access to the error-correcting code memory DRAM chip.

In some embodiments, when the memory bus is locked it may respond falsely to the computer system. For example, a request for a particular piece of information may yield a response that includes a random string of characters. Alternatively, a request for a particular piece of information may yield a response that states that a particular piece of information is not available even though the information is indeed stored on the memory module. The memory bus may receive a verification key from the computer system. The verification key may be sent by the memory bus to the comparator. In some embodiments, the verification key may be stored in a temporary store for retrieval by the comparator.

The VPD of the memory module may store identifying information that pertains to the memory module. The identifying information may include the date of manufacture of the memory module. The identifying information may include the serial number of the memory module. The identifying information on the VPD may refer to the memory module as a singular unit. The identifying information may refer to individual components on the memory module. The VPD of the memory module may include a reference key that is associated with the memory module.

In some embodiments, the VPD of the memory module may include multiple reference keys with each of the reference keys being associated with an individual component of the memory module. For example, in a memory module contains two DRAM chips, each of the DRAM chips may have memory arrays that store information for the computer system. In this example the VPD may contains two reference keys: the first reference key referring to the first DRAM chip, and the second reference key referring to the second DRAM chip.

The comparator of the memory module may be located on the memory module. The comparator may retrieve the reference key from the VPD. The comparator may receive the verification key from the memory bus. In some embodiments, the comparator may retrieve the verification key from the memory bus. The comparator may output a signal indicative of a matching reference key and verification key, or indicative of a non-matching reference key and verification key. This output may be in the form of a binary number (e.g., a '1' indicating a match and a '0' indicating no match). The reference key and the verification key (alternatively, keys) may each be in the form of a series of numbers. Each of the keys may also be in the form of a string of alphanumeric characters. In some embodiments, the keys may each be in the form of a series of voltages. In this embodiment the comparator may additionally comprise two voltage regulator modules (herein, VRMs).

For example, the first VRM may retrieve the reference key from the VPD and output a first reference voltage based on the first voltage of the reference key. The second VRM may receive the verification key from the memory bus and output a first verification voltage based on the first voltage of the verification key. If the comparator determines that the first reference voltage matches the first verification voltage, the comparator may instruct the VRMs to prepare the next voltages for comparison. Then, the first VRM may output a second reference voltage and the second VRM may output a second verification voltage, respectively. This voltage-by-voltage comparison may be performed as many times as the length of the reference key. Finally, once all reference voltages have been compared with and matched to the verification voltages by the comparator, the comparator may return a signal indicating that the reference key matches the verification key. If the comparator determines that any of the reference voltages do not match their corresponding verification voltages, the comparator may return a signal indicating no match.

The logic chip of the memory module may be located inside the DRAM chips. In some embodiments, the logic chip may be located on the memory module but outside of the DRAM chips. The logic chip may receive the signal indicating a matching reference key and a verification key. The logic chip may then direct the communication bus to send a response to the computer system with the information that the computer system requests. In some embodiments, the logic chip may receive the signal indicating a reference key and a verification key that do not match. In this embodiment the logic chip may direct the communication bus to send a false response.

FIG. 1 depicts an example computer system 100 with one or more memory modules consistent with embodiments of the present disclosure. The computer system 100 comprises a circuit board 110, a processor 112, memory modules 114A and 114B (herein 114), a circuit-board controller 116, and a key-store 118. It should be appreciated that 115 depicts one of the memory modules 114 in additional detail. The circuit board 110 may be a main logic board or motherboard having attached expansions cards (not depicted), such as when the computer system 100 is a personal computer or a server. In some embodiments, the circuit board 110 may be a stand-alone module, such as when the computer system 100 is a single-purpose device (e.g., a computer for an automobile, a network router, or a game console). The circuit board 110 may facilitate communication between the processor 112, the memory modules 114, and the circuit-board controller 116.

The processor 112 may generate requests for the memory modules 114 and may perform assigned tasks. The circuit-board controller 116 may forward the requests from the processor 112 to the memory modules 114. In some embodiments, the circuit-board controller 116 may also provide other components (not depicted) of the computer system 100 access to the memory modules 114. For example, the computer system 100 may provide, as one such component, a word-processing program to a user. In this scenario, the user may want to load a document into the memory modules 114 from a hard-disk drive. In this example, the circuit-board controller 116 accesses the memory modules 114 on behalf of the hard-disk drive. Key-store 118 may be located within circuit-board controller 116. Key-store 118 may contain one or more signatures necessary for the circuit-board controller 116 to communicate with the memory modules 114. The signatures may be input into the key-store 118 by the user. The signatures may be provided to the user with the memory modules 114 (e.g., when the user acquires the memory modules, the signatures may be in the packaging with the memory modules).

Memory modules 114 each include the following: a bus 122, memory chips 124A, 124B, 124C, 124D, 124E, 124F (herein 124), a vital product data store 126 (herein VPD), and a security chip 128. The bus 122 may receive requests from the circuit-board controller 116. The bus 122 may issue responses to the circuit-board controller 116 that fulfill the requests. In some embodiments, the bus 122 may receive requests from both the processor 112 and the circuit-board controller 116. The memory chips 124 may store information for the computer system 100. The memory chips 124 may contain multiple memory arrays and associated transistors for storing and retrieving information (not depicted). The VPD 126 may contain one or more signatures to be compared with the signatures from the key-store 118. The VPD 126 may also contain information that describes the memory modules 114 (e.g., a model number, a serial number). The security chip 128 may retrieve the signatures from the VPD 126. The security chip may retrieve the signatures from the key-store 118, by way of the bus 122.

The security chip 128 may control the behavior of the bus 122. For example, a request 130 comes from the circuit-board controller 116 to the bus 122. A verification signature 132, stored in the key-store 116 of the circuit-board controller 116, also comes from the circuit-board controller 116 to the bus 122. The security chip 128 retrieves the verification signature 132 from the bus 122. The security chip 128 retrieves reference signature 134 from the VPD 126. The security chip 128 compares the verification signature 132 with the reference signature 134, and, if they match, the security chip instructs the bus 122 to send a response 136 to the circuit-board controller 116.

Figure 2:
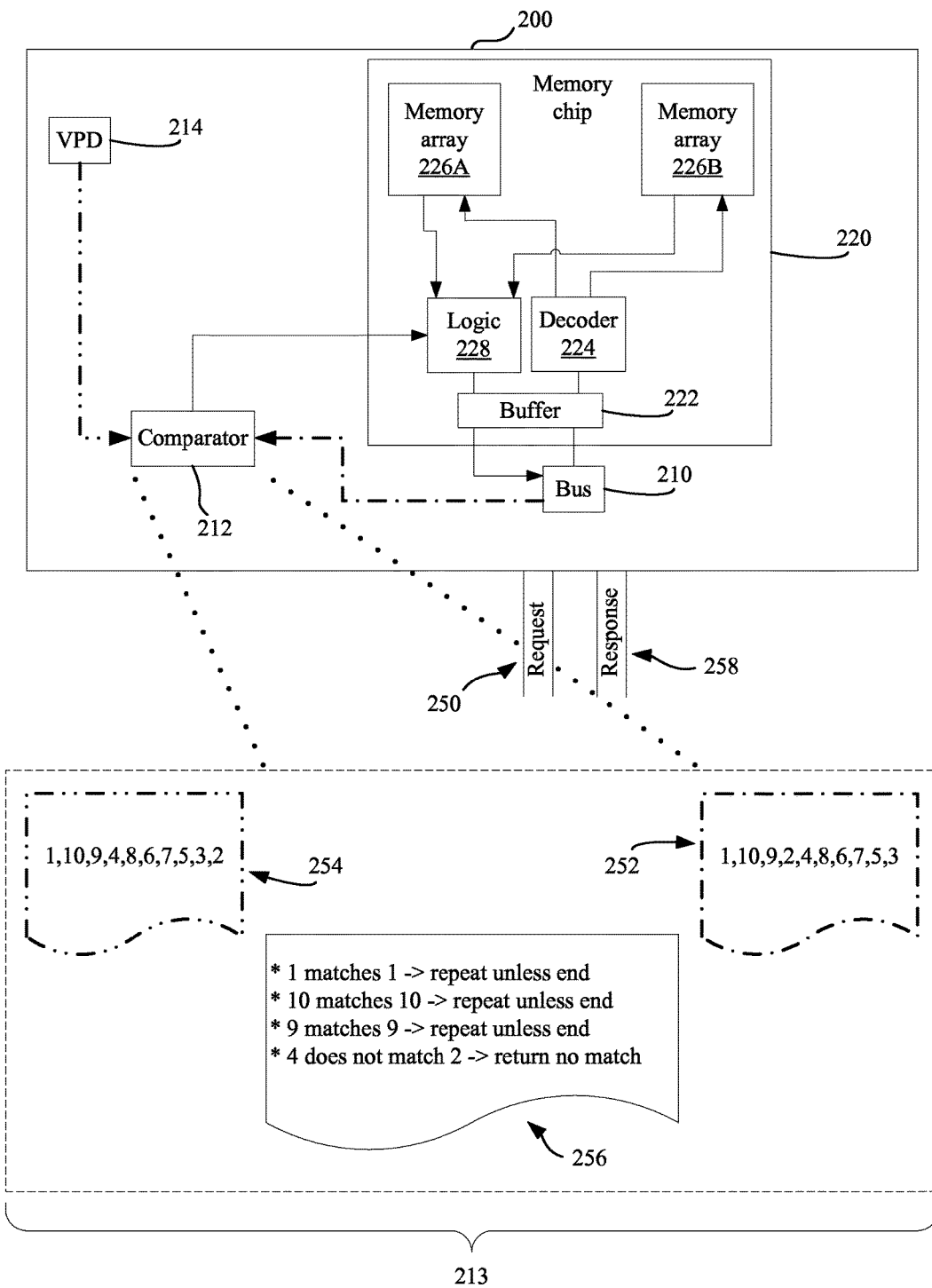
FIG. 2 depicts an example memory module consistent with embodiments of the present disclosure.

FIG. 2 depicts an example memory module 200 consistent with embodiments of the present disclosure. The memory module 200 includes a bus 210, a comparator 212, a VPD 214, and a memory chip 220. It should be appreciated that 213 depicts the workings of the comparator 212 in additional detail. The bus 210 may receive requests from a memory controller (not depicted), such as a request to read data from or write data to the memory chip 220. The requests may be in the form of mode register set commands. The bus 210 may transmit the requests to the memory chip 220. The bus 210 may also receive one or more keys from the memory controller, such as a verification signature. The bus 210 may transmit the keys to the comparator 212. The comparator 212 may retrieve one or more keys from the VPD 214, such as a reference signature.

Memory chip 220 includes a buffer 222, a decoder 224, one or more memory arrays 226A, 226B (herein 226), and logic 228. The memory chip 220 may be a DRAM chip. In some embodiments, there may be multiple memory chips (not depicted). The buffer 222 may receive requests from the bus 210. The buffer 222 may transmit the requests to the decoder 224, and may also transmit the requests to the memory arrays 226. The buffer 222 may receive responses from the logic 228. The buffer 222 may transmit the responses to the bus 210. The decoder 224 may process the requests from the memory controller. The decoder may transmit the requests to the appropriate memory arrays 226. The logic may receive a result from the comparator 212. The logic may also receive the responses from the memory arrays 226. The logic may transmit the responses to the bus 210 dependent upon the result from the comparator 212.

The memory module 200 may receive a request 250 from the memory controller to read data from the memory arrays 226. The request 250 may be accompanied by a verification signature 252. The verification signature 252 may be read by the comparator 212. The comparator may read reference signature 254 from the VPD 214. The comparator 212 may generate a comparison status by comparing the signatures character-by-character to determine 256 that the signatures do not match. The request 250 may be transmitted by the buffer 222 to the decoder 224 and the memory arrays 226. The memory arrays 226 may transmit a response containing the data to the logic 228. The comparator 212 making the determination 256 may indicate in a comparison status to the logic 228 that the verification signature 252 does not match the reference signature 254. The logic 228 may instruct the buffer 222 not to respond, and a response 258 may not be provided. In some embodiments, the logic 228 may instruct the buffer to create a response 258 with data that is not requested by the memory controller (e.g., all '0' characters).

Figure 3:
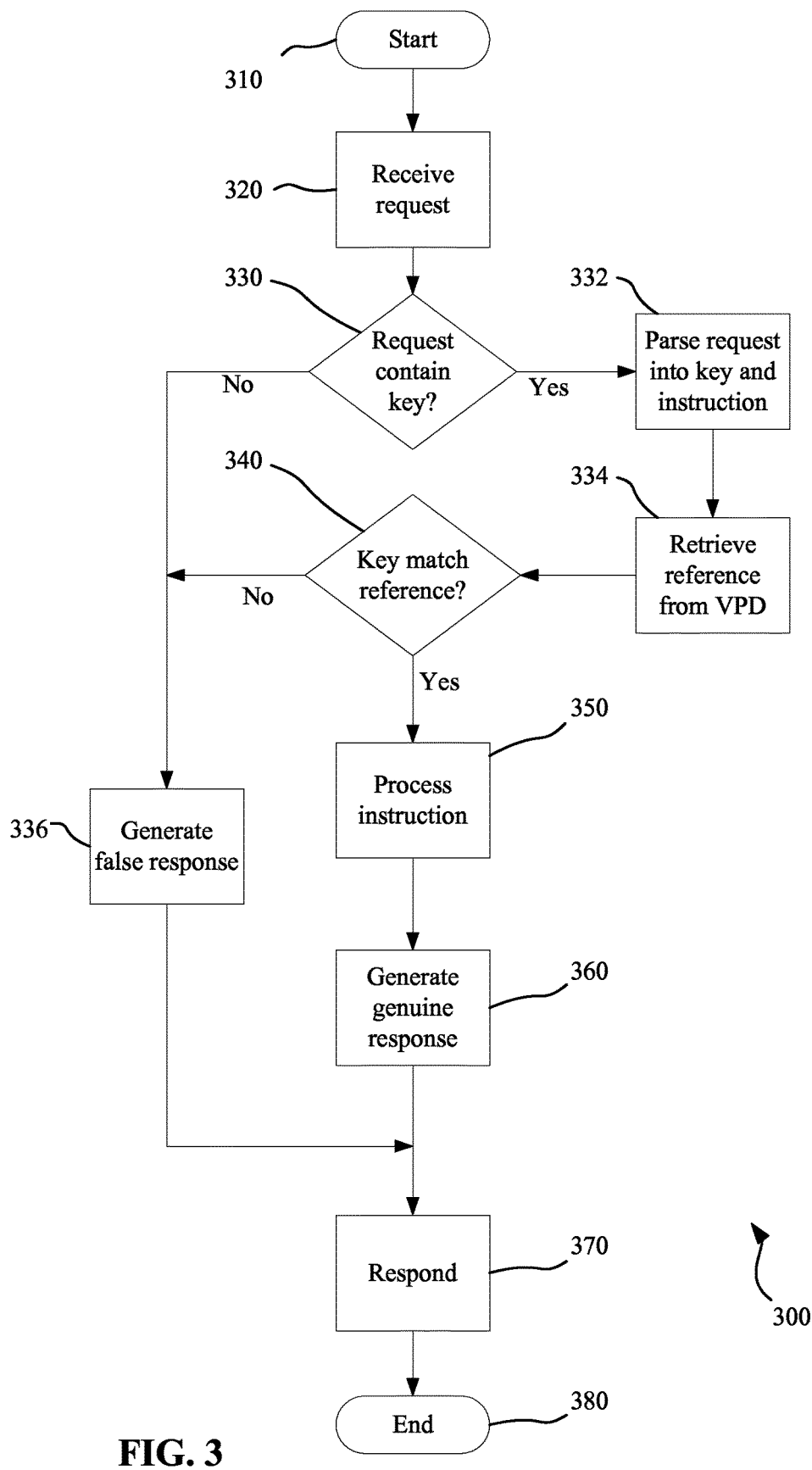
FIG. 3 depicts an example method for processing requests to a memory module consistent with embodiments of the present disclosure.

FIG. 3 depicts an example method 300 for processing requests to a memory module consistent with embodiments of the present disclosure. The memory module may be receiving requests from a memory controller from an attached computer system. In some embodiments, the memory module may be receiving requests from other components of the attached computer system.

From start 310, a memory module may be receive a request, at 320, from the memory controller. Next, the memory module may determine if the request contains a key, at 330. The key may be in the form of a decimal number. In some embodiments, the key may be in the form of a series of voltages values. If the request does contain a key, the request may be parsed into the key and an instruction, at 332. Next, at 334, the memory module may retrieve a reference from a VPD. The VPD may contain other unrelated information, such as a serial numbers or product specifications. The reference may be a string of decimal numbers or may be a series of voltage values. In some embodiments, the reference may be may be made, either in whole or in part, from the unrelated information. For example, the reference may be the first, third, and seventh characters of a serial number combined with the first, second, and firth characters of a model number, appended with twelve additional characters. If the request does not contain a key, the memory module may generate a false response, at 336.

The memory module may then determine if the key from the memory controller and the reference from the VPD are the same, at 340. The memory module may make the determination that the key and the reference are the same by using two or more voltage regulator modules and a voltage comparator. If the key and the reference are not the same, the memory module may generate a false response, at 336. If the key and the reference are the same, then the memory module may process the instruction (i.e., read the data in the memory array), at 350. Next, the memory module may generate a genuine response, at 360, that contains the data requested by the memory controller. Finally, a response may be transmitted, at 370, and the method 300 ends at 380. If a false response was generated at 336, then the response received by the memory controller may be data unrelated to request from the memory controller (e.g., all '0' characters, random characters, an "access denied" message).

Figure 4:
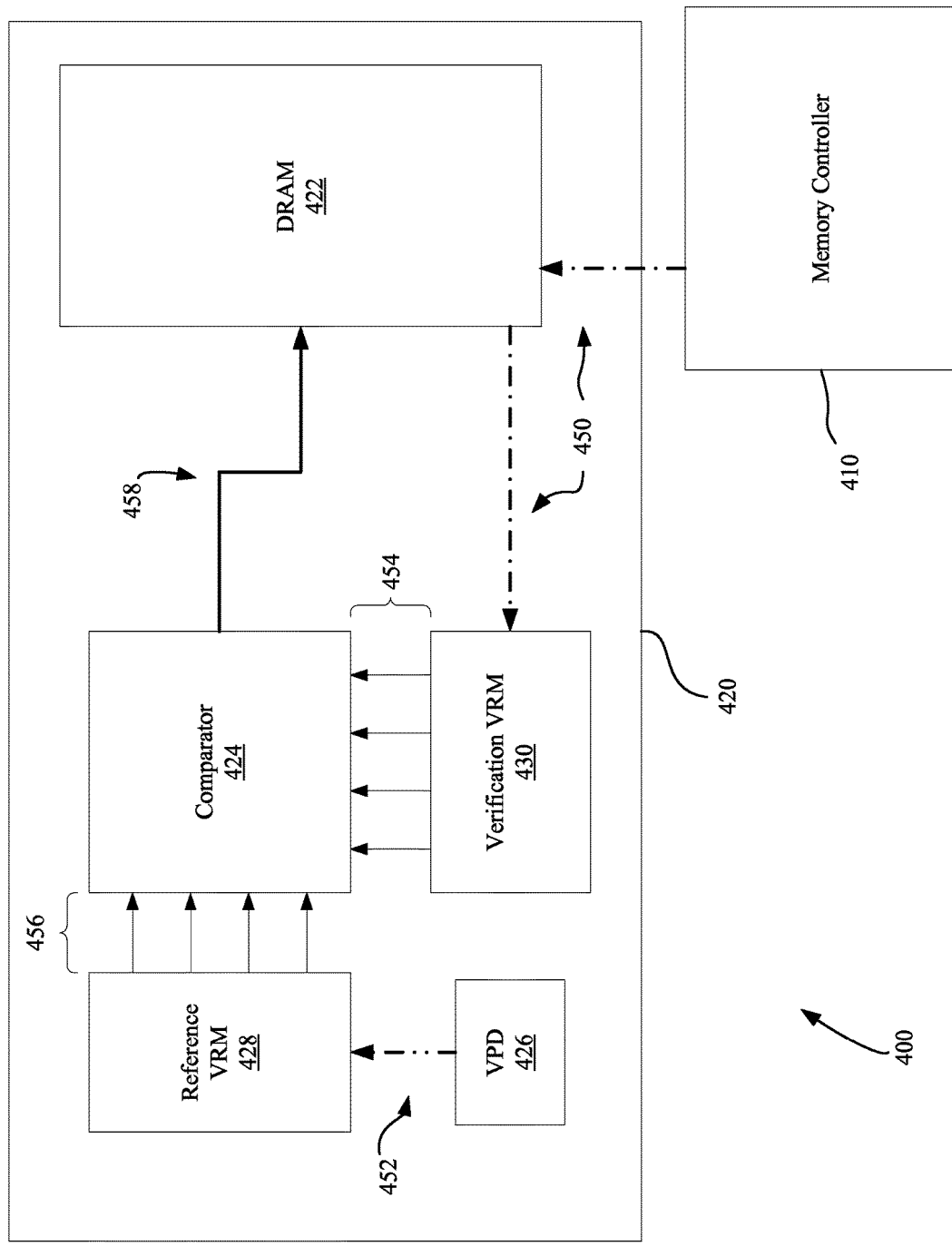
FIG. 4 depicts an example system consistent with embodiments of the present disclosure.

FIG. 4 depicts an example system 400 consistent with embodiments of the present disclosure. The system 400 comprises a memory controller 410 and a memory module 420. The memory controller 410 may be communicatively coupled to the memory module 420, such that the memory controller may send requests and the memory module may send responses. The memory controller 410 may form requests for other elements of the system not depicted in FIG. 4. The memory module 420 comprises a DRAM 422, a comparator 424, a VPD 426, a reference VRM 428, and a Verification VRM 430.

The memory module 420 may receive a verification key 450 from the memory controller 410. The verification key 450 may be received in a request for data from the memory controller. In some embodiments, the verification key 450 may be received before the request for data. The verification key 450 may be routed from the memory controller 410 to the DRAM 422, and from the DRAM to the Verification VRM 430. The verification VRM 430 may output a series of verification signatures 454 based upon the verification key 450. The reference key 452 may be retrieved by the reference VRM 428. The reference VRM 428 may output a series of reference signatures 456 based upon the reference key 452. The comparator 424 may compare the verification signature 454 and the reference signature 456 and determine that the verification key 450 matches the reference key 452. This determination, or comparison status 458, may be communicated to the DRAM 422. Based on the comparison status 458, the DRAM 422 may answer a request from the memory controller 410 by sending a response to the memory controller.

The series of verification signatures 454 and reference signatures 456 may be in the form of a series of singular voltages. For example and in a first scenario, a verification signature 454 is comprised of 100 millivolts (here, mV), then 100 mV, then 500 mV, then 800 mV, and finally 500 mV; a reference signature 456 is comprised of 100 mV, then 200 mV, then 500 mV, then 800 mV and finally 500 mV. In the first scenario the comparator 424 may determine that the verification signature 454 and the reference signature do not match (e.g., the second voltage of 100 mV and 200 mV are not the same), and the comparator may generate a comparison status 458 indicating that the signatures do not match.

In some embodiments, the series of verification signatures 454 and reference signatures 456 may be in the form of multiple voltages. For example and in a second scenario, the reference VRM 428 and the verification VRM 430 may be coupled to the comparator through multiple voltage carrying pathways that allow multiple voltages to be passed to the comparator contemporaneously. The comparator 428 may compare the multiple voltages from each of the VRMs to determine if the verification signatures 454 and the reference signature 456 match. In the second scenario, a verification signature 454 may be comprised of 100 mV and 500 mV, then 100 mV and 800 mV, then 500 mV and 100 mV, and finally 800 mV and 100 mV. Also in the second scenario a reference signature 456 may be comprised of 100 mV and 500 mV, then 100 mV and 800 mV, then 500 mV and 100 mV, and finally 800 mV and 100 mV. The comparator 428 may compare the voltages and determine a comparison status 458 indicating that the signatures do match.

The flowchart and block diagrams in the Figures illustrate the architecture, functionality, and operation of possible implementations of systems, methods, and memory modules according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for securing data on at least one memory chip of a memory module, the method comprising:
receiving, by the memory module, a request for the data from a computer system;
receiving, by the memory module, a verification key from the computer system;
retrieving, by the memory module, a reference key, the reference key stored on the memory module;
generating, by the memory module, a first set of one or more voltages, each voltage capable of being at one of three or more voltage levels, based on the verification key;
generating, by the memory module, a second set of one or more voltages, each voltage capable of being at one of three or more voltage levels, based on the reference key;
generating, by the memory module, a comparison status in response to comparing the first set and the second set of one or more voltages;
and sending, by the memory module, a response to the computer system in response to the comparison status.

2. The method of claim 1, wherein the response is the data from the at least one memory chip and the comparison status is that the verification key and the reference key match.

3. The method of claim 1, wherein the response is false data and the comparison status is that the verification key and the reference key do not match.

4. The method of claim 3, wherein the false data is selected from the group consisting of all zeros, all ones, random characters, and nothing.

5. The method of claim 1, wherein the response is the status of the memory module and the comparison status is that the verification key and the reference key match.

6. The method of claim 1, wherein the reference key is comprised of a first set of one or more voltages, and wherein the verification key is comprised of a second set of one or more voltages, and wherein the comparison status is generated by outputting electrical energy based on the first set of voltages and the second set of voltages.

7. A memory module for securing data stored on a memory module, the memory module comprising:
at least one memory chip configured to store the data;
a communication bus configured to receive a request for the data from a computer system, the communication bus configured to transmit the request for the data to the at least one memory chip, the communication bus further configured to receive a verification key from the computer system;
a reference chip configured to store a reference key related to the memory module;
a comparison chip configured to receive the verification key from the communication bus, the comparison chip further configured to receive the reference key from the reference chip, the comparison chip further configured to generate a first set of one or more voltages, each voltage capable of being at one of three or more voltage levels, based on the verification key, and a second set of one or more voltages, each voltage capable of being at one of three or more voltage levels, based on the reference key; the comparison chip further configured to generate a comparison status in response to comparing the first set and the second set of voltages;
and a logic chip configured to receive the data from the at least one memory chip, the logic chip further configured to receive the comparison status from the comparison chip, the logic chip further configured to send a response to the communication bus in response to the comparison status.

8. The memory module of claim 7, wherein the response is the data from the at least one memory chip and the comparison status is that the first set of voltages and the second set of voltages match.

9. The memory module of claim 7, wherein the response is false data and the comparison status is that the first set of voltages and the second set of voltages do not match.

10. The memory module of claim 9, wherein the false data is selected from the group consisting of all zeros, all ones, random characters, and nothing.

11. The memory module of claim 7, wherein the response is the status of the memory module and the comparison status is that the first set of voltages and the second set of voltages match.

12. The memory module of claim 7, wherein the reference key is comprised of a first set of one or more voltages, and wherein the verification key is comprised of a second set of one or more voltages, and wherein the comparison status is generated by outputting electrical energy based on the first set of voltages and the second set of voltages.

13. The memory module of claim 7, wherein the reference chip is a vital product data chip further configured to store an identification number, the identification number corresponding to the memory module.

14. The memory module of claim 7, wherein the logic chip is located inside the at least one memory chip.

15. A system for securing data, the system comprising:
a processor;
a memory controller configured to receive a request for the data from the processor;
and a memory module comprising:
at least one memory chip configured to store the data;
a communication bus configured to receive the request and a verification key from the memory controller, transmit the request to the memory chip, and send a response to the memory controller;
a reference chip configured to store a reference key related to the memory module;
a comparison chip configured to receive the verification key from the communication bus, receive the reference key from the reference chip, the comparison chip further configured to generate a first set of one or more voltages, each voltage capable of being at one of three or more voltage levels, based on the verification key, and a second set of one or more voltages, each voltage capable of being at one of three or more voltage levels, based on the reference key; and generate a comparison status in response to comparing the verification key and the reference key;
and a logic chip configured to receive the data from the memory chip, receive the comparison status from the comparison chip, generate, based on the comparison status, a response, and transmit the response to the communication bus.

16. The system of claim 15, wherein the response is the data from the at least one memory chip and the comparison status is that the first set of voltages and the second set of voltages match.

17. The system of claim 15, wherein the response is false data and the comparison status is that the first set of voltages and the second set of voltages do not match.

18. The system of claim 17, wherein the false data is selected from the group consisting of all zeros, all ones, random characters, and nothing.

* * * * *